United States Patent [19]

Buchel et al.

[11] Patent Number: 4,952,467
[45] Date of Patent: Aug. 28, 1990

[54] PROCESS FOR PREPARING A COMPOUND USING A VANADIUM OXIDE DERIVATIVE FOR THE CATHODE OF A THERMAL CELL

[75] Inventors: Jean-Pierre Buchel, Creteil; Gilles Crépy, Evry; Véronique Danel, Rosny; Anne de Guibert, Paris, all of France

[73] Assignee: Societe Anonyme dite: SAFT, France

[21] Appl. No.: 354,236

[22] Filed: May 19, 1989

[30] Foreign Application Priority Data

May 25, 1988 [FR] France .................. 88 06945

[51] Int. Cl.$^5$ ............................................. H01M 4/04
[52] U.S. Cl. ...................................... 429/112; 423/463;
423/593; 429/218
[58] Field of Search ............... 429/16, 103, 112, 199,
429/218; 423/579, 636, 641, 643, 463, 466, 593,
62, 464

[56] References Cited

U.S. PATENT DOCUMENTS

| | | | |
|---|---|---|---|
| 3,258,365 | 6/1966 | Klopp | 136/90 |
| 3,311,503 | 3/1967 | Zellhoefer | 136/83 |
| 3,444,000 | 5/1969 | Gruher | 136/86 |
| 3,470,027 | 9/1969 | Nielsen | 136/83 |

FOREIGN PATENT DOCUMENTS 2142922 3/1972 Fed. Rep. of Germany .
0145261 6/1985 Fed. Rep. of Germany .

*Primary Examiner*—Anthony Skapars
*Attorney, Agent, or Firm*—Kenyon & Kenyon

[57] ABSTRACT

A process for preparing a compound using a vanadium oxide derivative for the cathode of a thermal cell. According to the invention, a powdered mixture is produced using vanadium pentoxide, a carbon, and a mixture of alkaline halides; then heat processing is conducted at a temperature ranging from 360° C. to 650° C. for a period ranging from 15 minutes to 2 hours inclusive.

A cathode material for a thermal cell is obtained which displays a stable discharge voltage (curve A).

10 Claims, 2 Drawing Sheets

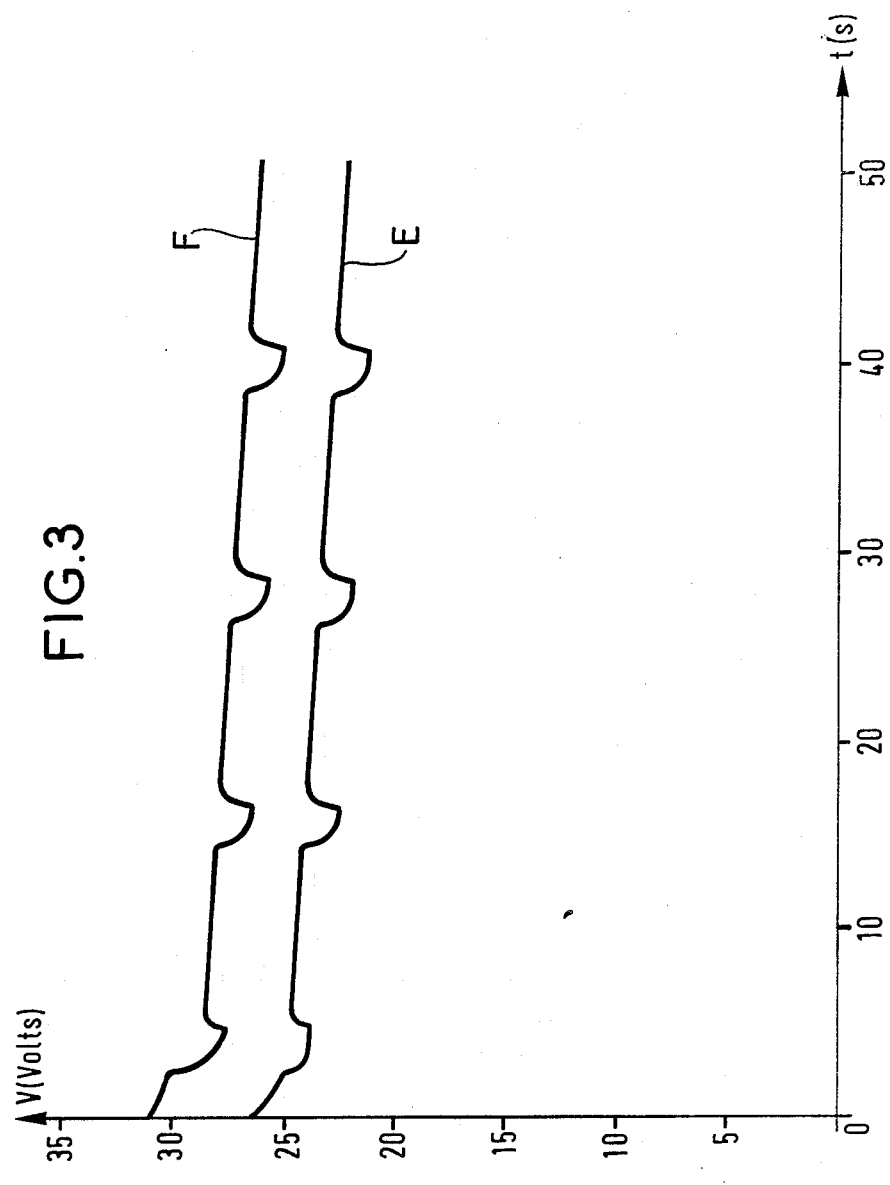

4,952,467

PROCESS FOR PREPARING A COMPOUND USING A VANADIUM OXIDE DERIVATIVE FOR THE CATHODE OF A THERMAL CELL

BACKGROUND OF THE INVENTION

1. Field of the Invention

This invention relates to a process for preparing a compound using a vanadium oxide derivative for the cathode of a thermal cell.

2. Related Art

Vanadium oxide, and more particularly, vanadium pentoxide, cannot be used directly as the active material of the cathode of a thermal cell because, on the one part, it is a poor electrical conductor and, on the other part, it is reactive in fused chloride media.

For those skilled in the art, improving the conductivity of cathodes by mixing this material with an electrical conductor such as graphite or carbon black may appear to be an obvious solution. However, when $V_2O_5$ is mixed with carbon black and one attempts to use this compound in the cathode of a thermal cell, the resulting mixtures are unstable and display low conductivity. In a battery, the result always translates into a series of potential discharge stages. In addition, mixtures containing graphite or carbon black in quantities sufficient to improve conductivity are always difficult to pelletize.

Other methods have been proposed for preparing vanadium oxide derivatives which are suitable for use as the cathode materials of thermal cells.

More specifically, U.S. Pat. No. 4,315,905 proposes the creation of an electrically conductive product to be used as a cathode material or as a cathode coating material by heating vanadium oxide in a reducing or neutral gaseous atmosphere (hydrogenated nitrogen or helium). The resulting mixture contains both $V_6O_{13}$ and an unidentified derivative of $V_2O_5$, but no example for the use of this compound is provided.

European patent no. BE-A-145,261, dated Nov. 6, 1984 describes the use of a cathode material selected from the group comprising one or more of the following compounds:
$V_6O_{13-x}$ ($0<x<0.5$), $VO_{2\pm z}$ ($0<z<0.05$), $Li_yV_2O_5$ ($0.88<y<1$), $V_3O_7$ and $LiV_3O_8$.

However, the compounds described above are not suitable for use as a cathode material in a thermal cell. More particularly, they do not display a stable discharge voltage, as shown by the examples of discharge provided in the patent. Regardless of the compound employed, the discharge curves display a steep slope and a multiplicity of stages. In addition, the preparation process requires that several operations be performed in succession in order to produce the final cathode mixture containing the electrical conductor and a suitable quantity of electrolyte; the preparation time, which ranges from 8 hours to several days, is prohibitive.

The object of this invention is to implement a simple process for preparing a compound using a vanadium oxide derivative, wherein this compound is suitable for use as a cathode material in a thermal cell and displays a stable discharge voltage.

This object is achieved by a process for preparing a compound using a vanadium oxide derivative which is suitable for use as a cathode material in a thermal cell, and wherein:

a powdered mixture is prepared by combining vanadium pentoxide $V_2O_5$, a carbon, in proportion to the $V_2O_5$, ranging from 3 percent to 20 percent by weight inclusive, and a mixture of alkaline halides, in proportion to the $V_2O_5$, ranging from 15 percent to 50 percent by weight inclusive;

heat processing is conducted at a temperature which is higher than the melting point of said mixture of halides, wherein said temperature ranges from 365° C. to 650° C. inclusive, for a time period ranging from 15 minutes to 2 hours inclusive.

Preferably, said carbon is a gas black, such as carbon black, acetylene black or benzene black;

said mixture of alkaline halides is a mixture of lithium and potassium halides, selected from the group consisting of the eutectic LiCl-KCl, mixtures of LiCl-KCl containing from 50 mole percent to 80 mole percent of LiCl, and ternary mixtures of LiCl-LiBr-LiF, LiCl-LiBr-KBr;

the proportion of said carbon ranges from 5 percent to 10 percent by weight of $V_2O_5$ inclusive;

the proportion of said mixture of alkaline halides ranges from 30 percent to 45 percent by weight of $V_2O_5$ inclusive; and the said heat processing temperature ranges from 410° C. to 550° C., and the duration of the said heat processing ranges from ½ hour to 1 hour inclusive.

The resulting compound is then cooled and ground to a particle size of less than 100 microns. It is then pelletized for use as a cathode.

A further object of the invention is a thermal cell comprising the foregoing cathode and, in addition, an anode of lithium or of a lithium alloy selected from the group of compounds consisting of lithium-aluminum, lithium-silicon and lithium-boron, and an electrolyte composed of a binder and of said mixture of alkaline halides.

The binder may be selected from the group consisting of $SiO_2$, $MgO$, and $Al_2O_3$.

In an unexpected manner, it appears that during the process of fusing the vanadium pentoxide and the mixture of alkaline halides, the gas black exerts a highly specific effect on the constitution of the resulting mixture. This may be due to the fact that the presence of superficial carbon-oxygen bonds formed during the high-temperature heating process subsequently facilitate the transfer of electricity.

During the heat processing period, the mixture of $V_2O_5$ and the carbon and the mixture of alkaline halides produces a controlled and reproducible decomposition. It is possible that the carbon also acts as a catalyst during this decomposition process.

The process according to the invention provides for obtaining a complex compound displaying properties which make it well suited for use as the cathode of a thermal cell because:

this complex compound is stable in the operating temperature range applicable to a thermal cell;

when discharging at a constant current, it displays a single discharge stage, which is stable relative to a lithium electrode; this stage being able to be established at +2.5 volts; and it is well suited for the manufacture of thin pellets.

BRIEF DESCRIPTION OF THE DRAWINGS

Other characteristics and advantages of this invention shall be made apparent in the following description of various embodiments, which are provided for purposes of illustration and are not to be construed as limiting examples.

FIG. 3 illustrates discharge curves for a battery comprising thermal cells according to the invention and for a battery comprising cells of the prior art.

DETAILED DESCRIPTION OF THE PREFERRED EMBODIMENTS

In a first example of an embodiment, 100 grams of $V_2O_5$ powder are thoroughly mixed for one hour with 50 grams of LiCl-KCl eutectic and 10 grams of acetylene black. This mixture is then placed in an oven and heated to 550° C. in a neutral atmosphere, such as argon, for a period of 30 minutes.

The resulting composition A is cooled in a dry atmosphere and ground to a particle size of less than 100 microns.

A cathode A having a thickness of 0.4 mm is then produced by pelletizing. A couple is produced comprising a cathode A, an electrolyte formed of the LiCl-KCl eutectic with the addition of a binder such as $SiO_2$ and an anolyte of a lithium and aluminum alloy LiAl.

Figure 1:
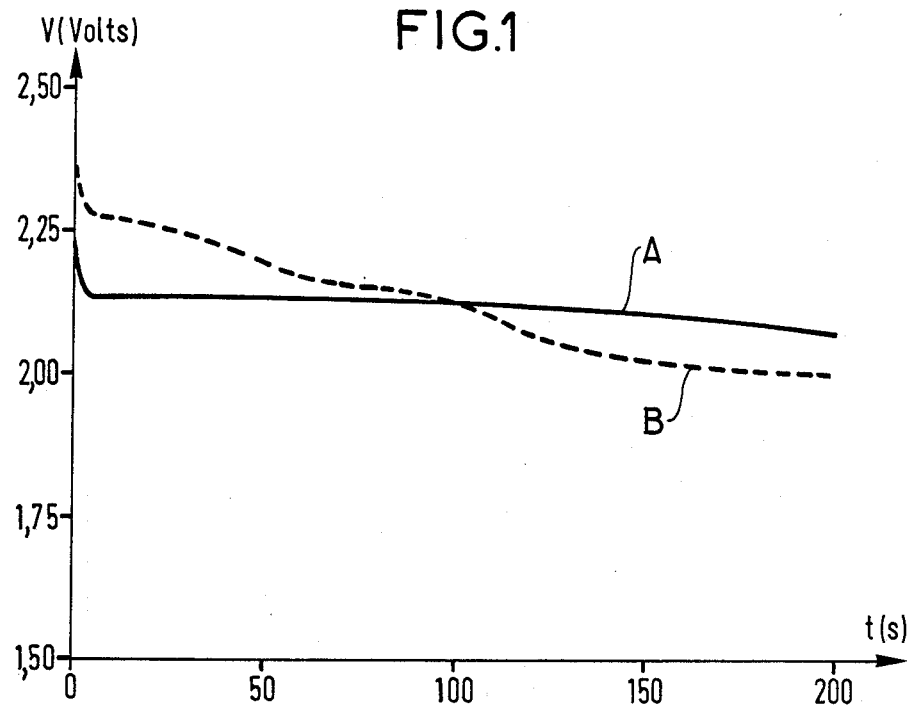
FIG. 1 shows the discharge curves for a prior art cathode and for a cathode made by the process according to the invention.

The graph of FIG. 1 showing, along its ordinate, voltage V (in volts) and, along its abscissa, time t in seconds, illustrates the discharge A of the aforesaid couple with a current density of 100 $mA/cm^2$ at a temperature of 450° C. A voltage stage is observed at 2.15 volts.

This graph also illustrates discharge B for a prior art cathode produced according to the process described in European patent BE-A-145,261, under conditions identical to those described in the foregoing, wherein a mixture comprising $VO_2$ and $Y-LiV_2O_5$ is employed. Several discharge stages are observed. The advantage of the composition according to the invention is thus clearly illustrated.

Other compositions were produced using the same basic products in the same proportions as those cited in the first example described above, while modifying the heat processing.

Table I shows, for each process, the initial voltage of the couple Vo (in volts), the voltage V (in volts) of the stage, the capacity C of the couple (in mAh) with a stopping voltage of 2.0 volts, and the output Rt as a percentage. The optimum conditions are found in the range from 410° C. to 550° C., with a processing time ranging from 30 minutes to 1 hour inclusive.

TABLE I

| Heat Processing | | Vo | V Stage | Stoppage at 2.0 V/LiAl | |
|---|---|---|---|---|---|
| Temperature | Time | (V) | (V) | C (mAh) | Rt (%)* |
| 365° C. | 1 h | 2.85 | 2.50 | 9.2 | 44 |
| | | | 2.25 | | |
| | | | 2.15 | | |
| 365° C. | 2 h | Non-pelletizable material | | | |
| 550° C. | 15 mn | 2.32 | 2.11 | 14.0 | 67 |
| 550° C. | 30 mn | 2.30 | 2.11 | 13.8 | 72 |
| 550° C. | 1 h | 2.22 | 2.15 | 19.6 | 74 |
| 550° C. | 2 h | 2.25 | 2.12 | 12.6 | 60 |
| 650° C. | 30 mn | 2.32 | 2.09 | 7.0 | 35 |
| 650° C. | 1 h | 2.38 | 2.09 | 9.2 | 44 |

*Rt. calculated over 1 F

In example 2, as in the previous example, 500 grams of $V_2O_5$ are mixed with 250 grams of electrolyte and 25 grams of acetylene black. This mixture is brought to a temperature of 410° C. in a neutral atmosphere for 1 hour.

Figure 2:
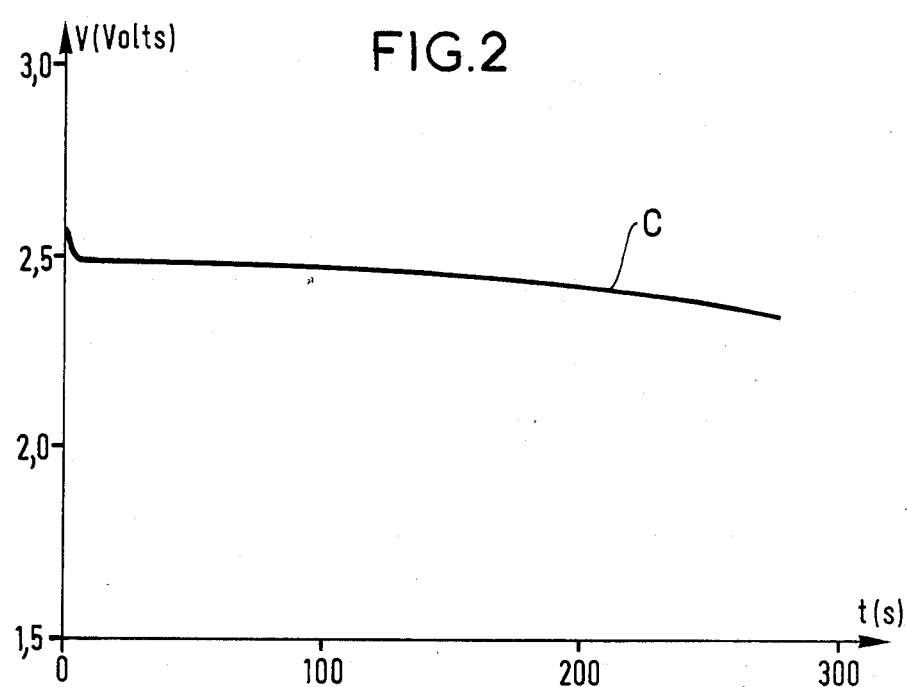
FIG. 2 shows a discharge curve for an alternative embodiment of a cathode produced using the process according to the invention.

The resulting composition is ground and pelletized to form a cathode C. A stack formed of this cathode, an electrolyte pellet of LiCl-KCl with a binder of $Al_2O_3$, and an anode formed of a thin layer of lithium-boron alloy is discharged at a temperature of 450° C. at a constant current having a density of 100 $mA/cm^2$. The corresponding curve C is shown in FIG. 2. A voltage stage is observed at 2.5 volts.

A battery using cells produced by the same process as described above is then constructed The cathode material is the same as described in example 1. The electrolyte pellets contain 85 percent LiCl-KCl eutectic and 15 percent $SiO_2$. The anolyte pellets contain 90 percent LiAl alloy and 10 percent LiCl-KCl eutectic An example of this type of battery structure is provided in "Proceedings of the 32nd International Power Sources Symposium, Electrochemical Society Inc., 1986, pages 686 et seq.," by J. Douglass Briscoe, Daniel Glen, SAFT America Inc.

A battery according to the invention was discharged at ambient temperature, at a current density of 220 $mA/cm^2$, with periodic current impulses of 2 seconds at 600 $mA/cm^2$ (see curve F in FIG. 3). At such discharge rates, the voltage at the end of 45 seconds of discharging is 27 V (25 V during high rate impulses). Under the same discharge conditions, a cell utilizing the conventional cathode material $FeS_2$ and identical in all other respects will have a discharge voltage of 22.2 V at a discharge current density of 200 $mA/cm^2$, and 20.2 V at 600 $mA/cm^2$ (see curve E in FIG. 3).

Clearly, the invention is not limited to the embodiments described in the foregoing.

I claim:

1. A process for preparing a composition based on a vanadium oxide derivative which is suitable for use as a cathode material in a thermal cell, wherein the process comprises:

preparing a powdered mixture by combining vanadium pentoxide $V_2O_5$, a carbon ranging from 3 percent to 20 percent inclusive by weight of $V_2O_5$, and a mixture of alkaline halides ranging from 15 percent to 50 percent inclusive by weight of $V_2O_5$;

heat processing the prepared powdered mixture at a temperature which is higher than the melting point of said mixture of halides, wherein said temperature ranges from 365° C. to 650° C. inclusive, for a time period ranging from 15 minutes to 2 hours inclusive to produce a heat processed composition suitable for a cathode of a thermal cell.

2. A process as claimed in claim 1, wherein said carbon is a gas black, such as carbon black, acetylene black or benzene black.

3. A process as claimed in claim 1, wherein said mixture of alkaline halides is a mixture of lithium and potassium halides selected from the group consisting of the eutectic LiCl-KCl, mixtures of LiCl-KCl containing from 50 mole percent to 80 mole percent of LiCl, and ternary mixtures of LiCl-LiBr-LiF and of LiCl-LiBr-KBr.

4. A process as claimed in claim 1 or 2 or 3, wherein the proportion of said carbon ranges from 5 percent to 10 percent by weight of $V_2O_5$ inclusive.

5. A process as claimed in claim 1 or 2 or 3, wherein the proportion of said mixture of alkaline halides ranges from 30 percent to 45 percent by weight of $V_2O_5$ inclusive.

6. A process as claimed in claim 1 or 2 or 3, wherein said processing temperature ranges from 410° C. to 550° C. inclusive.

7. A process as claimed in claim 6, wherein the duration of said heating step ranges from ½ hour to one hour inclusive.

8. A process for preparing a cathode for a thermal cell, wherein the process comprises:
   preparing a powdered mixture by combining vanadium pentoxide $V_2O_5$, a carbon ranging from 3 percent to 20 percent inclusive by weight of $V_2O_5$, and a mixture of alkaline halides ranging from 15 percent to 50 percent inclusive by weight of $V_2O_5$;
   heating the prepared powdered mixture at a temperature which is higher than the melting point of said mixture of halides, wherein said temperature ranges from 365° C. to 650° C. inclusive, for a time period ranging from 15 minutes to 2 hours inclusive;
   cooling the heat processed powdered mixture;
   grinding the cooled mixture to a particle size of less than 100 microns; and
   pelletizing the ground mixture.

9. A thermal cell comprising:
   a cathode prepared by the steps of:
   preparing a powdered mixture by combining vanadium pentoxide $V_2O_5$, a carbon ranging from 3 percent to 20 percent inclusive by weight of $V_2O_5$, and a mixture of alkaline halides ranging from 15 percent to 50 percent inclusive by weight of $V_2O_5$;
   heating the prepared powdered mixture at a temperature which is higher than the melting point of said mixture of halides, wherein said temperature ranges from 365° C. to 650° C. inclusive, for a time period ranging from 15 minutes to 2 hours inclusive;
   cooling the heat processed powdered mixture;
   grinding the cooled mixture to a particle size of less than 100 microns; and
   pelletizing the ground mixture;
   an anode of lithium or of a lithium alloy selected from the group consisting of compounds of lithium-aluminum, lithium-silicon and lithium-boron; and
   an electrolyte composed of a binder and of said mixture of alkaline halides.

10. A thermal cell as claimed in claim 9, wherein the binder is selected from the group consisting of $SiO_2$, $MgO$, and $Al_2O_3$.

* * * * *

UNITED STATES PATENT AND TRADEMARK OFFICE
CERTIFICATE OF CORRECTION

PATENT NO.  : 4,952,467
DATED       : August 28, 1990
INVENTOR(S) : BUCHEL, J-P, et al.

It is certified that error appears in the above-identified patent and that said Letters Patent is hereby corrected as shown below:

Column 1, line 43 change:  "$V_6O_{13}-x$" to --$V_6O_{13}+x$--.

Column 1, line 43 change:  "$(0 < X < 0.5)$" to --$(0 \leq X \leq 0.5)$--

Column 1, line 43 change:  "$(0 < z < 0.05)$" to --$(0 \leq z \leq 0.05)$--.

Column 1, line 44 change:  "$(0.88 < y < 1)$" to --$(0.88 \leq y \leq 1)$--

Column 1, lines 56 & 57 insert: --SUMMARY OF THE INVENTION--.

Column 4, line 15 change:  "constructed The" to --constructed. The--.

Column 4, line 19 change:  "eutectic" to --eutectic.--.

Signed and Sealed this

Twenty-eighth Day of April, 1992

*Attest:*

HARRY F. MANBECK, JR.

*Attesting Officer*     *Commissioner of Patents and Trademarks*